March 12, 1935.  J. E. REDFORD  1,994,180
BRAKE RIGGING
Filed Oct. 14, 1933
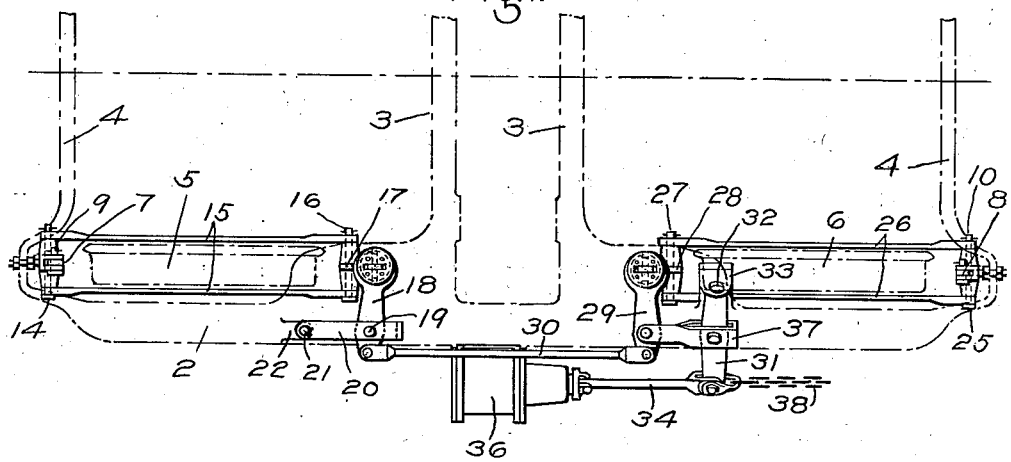
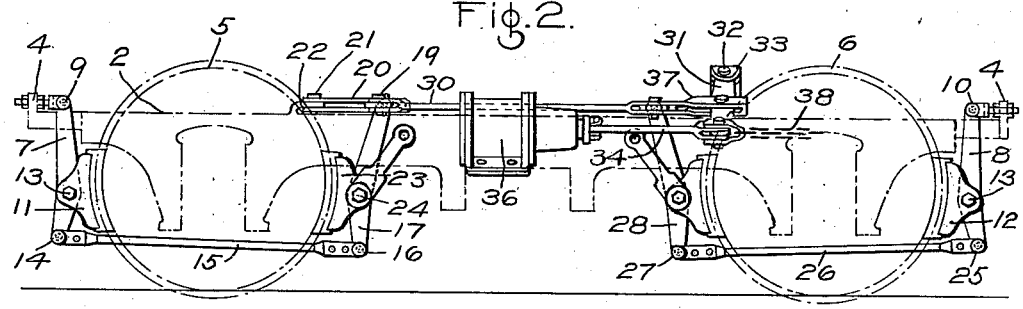
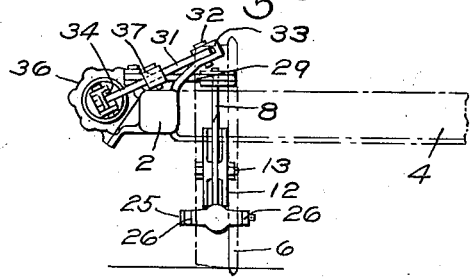
INVENTOR
JOHN E. REDFORD
BY Wm. M. Cady
ATTORNEY Patented Mar. 12, 1935

1,994,180

UNITED STATES PATENT OFFICE 1,994,180

BRAKE RIGGING

John E. Redford, Florissant, Mo., assignor to The American Brake Company, St. Louis, Mo., a corporation of Missouri Application October 14, 1933, Serial No. 693,612

3 Claims. (Cl. 188—56)

This invention relates to brake mechanism or rigging intended for use on railway car trucks, and more particularly to that type of brake mechanism in which there are two sets of operatively connected brake elements arranged one set on each side of the truck and in which there is a brake cylinder for operating each set of brake elements.

The principal object of my invention is to provide an improved brake mechanism or rigging of the above mentioned type.

Another object of my invention is to provide an improved brake mechanism or rigging of the above type which is simple and compact and in which the various parts are readily accessible for adjustment, replacement or for repair.

Other objects and advantages will appear in the following more detailed description of my invention.

In the accompanying drawing; Fig. 1 is a fragmentary plan view of a railway car truck equipped with brake rigging constructed in accordance with my present invention; and Figs. 2 and 3 are side and end elevational views, respectively, of the same.

In the drawing a brake mechanism or rigging made in accordance with my invention is shown in connection with a railway car truck frame comprising the usual spaced side members 2 which are connected together by transversely extending center and end members 3 and 4, respectively, only one of said side members being shown in the drawing. The side members 2 are adapted to be supported, in the usual manner, on journal boxes which are mounted on the outer ends of wheels and axle assemblies having the wheels 5 and 6. Inasmuch as the brake mechanism or rigging on one side of the truck is similar in construction and function to that on the other side of the truck, the following description will apply to the brake mechanism on either side of the truck.

As shown, the brake mechanism or rigging comprises outer dead hanger levers 7 and 8 which are pivotally supported from each end of the truck frame by means of pins 9 and 10, respectively, and are arranged adjacent the wheels 5 and 6, respectively. Intermediate their ends these dead hanger levers support brake heads 11 and 12, respectively, which are pivotally connected to the levers by means of pins or bolts 13, said brake heads carrying brake shoes adapted to engage the treads of the wheels 5 and 6, respectively.

The lower end of the dead lever 7 is pivotally connected, by means of a pin 14, to the adjacent outer ends of a pair of longitudinally extending connecting rods 15 which are arranged one on each side of the wheel 5. The inner ends of these rods 15 are pivotally connected, by means of a pin 16, to the lower end of a live truck lever 17 which is located between the wheels 5 and 6 and adjacent the wheel 5. The upper end of the live lever 17 is pivotally connected to the inner end of a horizontally disposed floating dead equalizing lever 18 which, intermediate its ends, is pivotally connected, by means of a pin 19, to one end of a metal strap member 20 which has its other end pivotally connected, by means of a pin 21, to a lug 22 which is integral with, and disposed above, the upper horizontal portion of the side member 2.

Intermediate its ends the live lever 17 supports a brake head 23 which is pivotally connected to the lever by means of a pin or bolt 24, said brake head carrying a brake shoe adapted to engage the tread of the wheel 5.

The lower end of the dead lever 8 is pivotally connected, by means of a pin 25, to the adjacent outer ends of a pair of longitudinally extending connecting rods 26 which are arranged one on each side of the wheel 6. The inner ends of the rods 26 are pivotally connected, by means of a pin 27, with the lower end of a live truck lever 28 which is located between the wheels 5 and 6 and adjacent the wheel 6. The upper end of the live lever 28 is pivotally connected to the inner end of a horizontally disposed live equalizing lever 29.

The outer ends of the horizontally disposed equalizing levers 18 and 29 are operatively connected together by a rod 30.

Located adjacent the horizontally disposed equalizing lever 29 is a cylinder lever 31 which is angularly disposed with relation to the lever 29 and which at its inner end is pivotally connected, by means of a pin 32, to a bracket 33 which is integral with, and disposed above, the upper horizontally disposed portion of the side member 2 of the truck frame. The outer end of the cylinder lever is operatively connected to a push rod 34 of a brake cylinder device 36 which is secured to the outer side face of a side member 2 of the truck frame.

The brake cylinder lever 31 and live equalizing lever 29 are operatively connected together intermediate their ends by a metal strap member 37.

It will be understood that fluid under pressure supplied to the brake cylinder device 36 causes the device to function to actuate the other brake rigging elements hereinbefore described to move the brake shoes into braking engagement with the treads of the wheels 5 and 6. Upon the release of fluid under pressure the brake cylinder device will function to effect or permit the release of the brakes.

For the purpose of actuating the brake rigging manually a hand brake connection in the form of a chain 38 is provided which is operatively connected, at one end, to the outer end of the cylinder lever 31, the other end of the chain being secured to the usual manually operable brake mast or shaft.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a brake mechanism, the combination with a truck frame, of pairs of interconnected truck levers, a pair of interconnected equalizing levers for actuating said pairs of truck levers, a cylinder lever pivotally connected at one end to the truck frame, a brake cylinder device with which the other end of the cylinder lever is operatively connected, and means operatively connecting said cylinder lever to one of said interconnected equalizing levers.

2. In a brake mechanism, the combination with a truck frame, of pairs of interconnected truck levers, each of said pairs of levers comprising a dead lever and a live lever, a horizontally disposed floating dead equalizing lever operatively connected at its inner end to the live truck lever of one of said pairs of truck levers, a horizontally disposed live equalizing lever operatively connected at its inner end to the live truck lever of the other of said pairs of truck levers, a rod operatively connecting the outer ends of said equalizing levers, a cylinder lever having its inner end pivotally connected to the truck frame, a brake cylinder device for actuating said cylinder lever, said brake cylinder device being operatively connected to the outer end of the cylinder lever, and means operatively connecting the cylinder lever to the live equalizing lever.

3. In a brake mechanism, the combination with a truck frame, of pairs of interconnected truck levers, each of said pairs of levers comprising a dead lever and a live lever, a horizontally disposed floating dead equalizing lever operatively connected at its inner end to the live truck lever of one of said pairs of truck levers, a horizontally disposed live equalizing lever operatively connected at its inner end to the live truck lever of the other of said pairs of truck levers, a rod operatively connecting the outer ends of said equalizing levers, a cylinder lever having its inner end pivotally connected to the truck frame, a brake cylinder device for actuating said cylinder lever, said brake cylinder device being operatively connected to the outer end of the cylinder lever, and means operatively interconnecting said cylinder lever and live equalizing lever intermediate their ends.

JOHN E. REDFORD.